March 14, 1939. H. G. BLEVINS 2,150,202
PIPE FORMING APPARATUS
Filed Feb. 12, 1937 9 Sheets-Sheet 2

March 14, 1939. H. G. BLEVINS 2,150,202
PIPE FORMING APPARATUS
Filed Feb. 12, 1937 9 Sheets-Sheet 4

WITNESSES
AB Wallace.
AH Oldham

INVENTOR.
Herman G. Blevins
BY Brown, Critchlow & Flick
his ATTORNEYS.

Patented Mar. 14, 1939

2,150,202

UNITED STATES PATENT OFFICE 2,150,202

PIPE FORMING APPARATUS

Herman G. Blevins, Sewickley, Pa., assignor, by mesne assignments, to The National Supply Company, Pittsburgh, Pa., a corporation of Pennsylvania Application February 12, 1937, Serial No. 125,450

17 Claims. (Cl. 153—54)

This invention relates to apparatus for forming and welding tubular members and more particularly is concerned with improved apparatus for forming and sizing relatively large diameter pipe blanks previously partly shaped in a forming press. This application is a continuation-in-part of my application entitled "Method and apparatus for welding", filed March 25, 1935, and bearing Serial No. 12,785, (Patent Number 2,084,889, granted June 22, 1937) and the present application specifically describes and claims the roll stands disclosed in my referred-to application.

Heretofore in the manufacture of welded pipe or tubing it has been the usual practice to continuously form relatively long lengths of flat skelp to tubular shape by passing the skelp through a series of roll stands which gradually bend the skelp into tubular shape. The tube so formed is continuously passed to a welder which welds the longitudinal seam and produces the finished article. In an operation of this character the forming operation, particularly on relatively small diameter, thin-walled tubing, presents no great problems inasmuch as the skelp is in the form of long usually coiled lengths and is continuous and passes directly from one roll stand to another. Thus the main skelp-handling difficulties are largely avoided once the front end of the skelp is through the various roll stands. However, in the manufacture of relatively large diameter, thick-walled pipe it is difficult to handle and form skelp in the same manner as the thin narrow skelp employed for tubing. Accordingly, in the manufacture of pipe some attempts have been made to form relatively short lengths of skelp, substantially equal to the length of one pipe, in a full length power press to tubular blanks which are then welded. However, lengths of heavy press-formed skelp are not sufficiently uniform in characteristics to provide for a high percentage yield when welded by a continuous electric resistance method and the repeated introduction of the individual lengths of the tubular blank into the various roll stands associated with the welder further complicates the welding process particularly if the pipe blanks are not properly formed, as, for example, of different outside diameters or having wavy portions therein.

Likewise in the manufacture of relatively light wall, small diameter tubing, and particularly by the continuous skelp method, very considerable lengths of tubing of one size are ordinarily made. This means that the particular roll sizes in the apparatus do not have to be changed over long periods. However, with respect to relatively thick-walled, large diameter pipe the manufacture of considerable quantities of one size is often interrupted by the necessity for manufacturing different sizes. Prior known apparatus for forming pipe blanks has not been adapted to rapid, effective changes of roll size and the result has been noticeable losses in production time.

In the manufacture of pipe and tubing wherein the same is continuously rolled to shape by individual roll stands or where the skelp is press-formed with a subsequent welding operation by an electric resistance method, it is noticeable that known apparatus is apt to produce waves and buckles in the tubular articles which are highly undesirable, both with respect to appearance and with respect to the uniform welding of the blanks. It is particularly true that, if the blank has any inwardly extending depressed portions, the heaviest pressure of surrounding rolls does not remove it but merely serves to exaggerate the condition.

It is the general object of my invention to avoid and overcome the foregoing and other difficulties attending the manufacture of tubular members by the provision of an improved forming and sizing mill for tubular blanks to prepare them for electric resistance welding.

Another object of my invention is the provision of tubular forming apparatus having individual forming rolls which rolls and associated pipe-handling mechanism can be readily changed or repositioned to adapt the apparatus to handle different sized members.

A further and more particular object of my invention is the provision of an improved type of entering roll stand positioned at the front of the forming mill and adapted to receive a press-formed blank and properly shape it to enter the forming stands proper of the mill.

Another specific object of my invention is the provision of an improved roll stand for forming tubular members which includes mechanism adapted to cooperate with an internal mandrel.

Another object of my invention is to provide roll stands adapted to receive the formed tubular blank and conduct it to the welding apparatus.

The foregoing and other objects of my invention are achieved by the provision of a forming mill including a plurality of individual roll stands having in combination therewith a chain conveyor or other means for positively moving the tubular blank to be formed through the entering stand and into the first driven stand. Positioned at one end of the mill adjacent the chain conveyor mechanism is an entering roll stand adapted to receive the tubular blank, regardless of its shape, and pass it to the forming roll stands proper in such condition that the blank under the influence of the chain enters the forming stands in satisfactory condition. One of the forming roll stands includes a pair of rolls cooperating with an internal mandrel and journaled on a pivotally mounted bracket whereby the introduction of the blank into the stand is facilitated. The various stands are adapted to take a plurality of roll sizes and changes of roll size are facilitated by the provision of inner housings and filler blocks removably fitting in an outer housing for each roll stand. Adjusting means are also provided to reposition the blank-handling mechanism to adapt it to handle a wide variety of blank sizes.

For a better understanding of the invention, reference should be had to the accompanying drawings, wherein Figs. 1a, 1b, and 1c comprise a diagrammatic plan view of a pipe-forming and welding apparatus embodying the principles of my invention.

General assembly

Figure 1A:
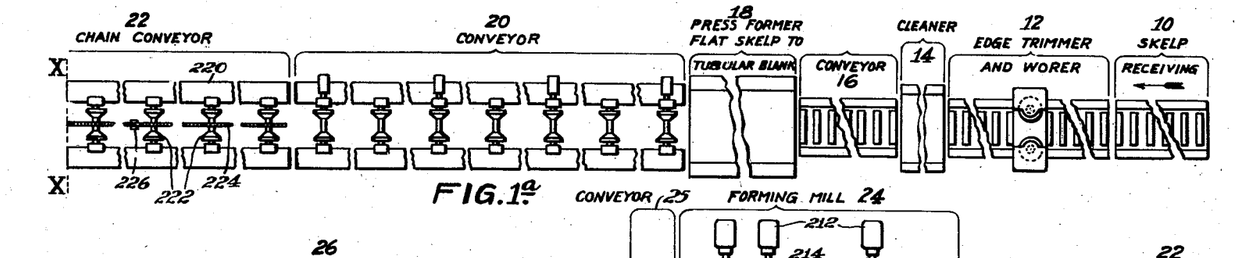
Figure 1B:
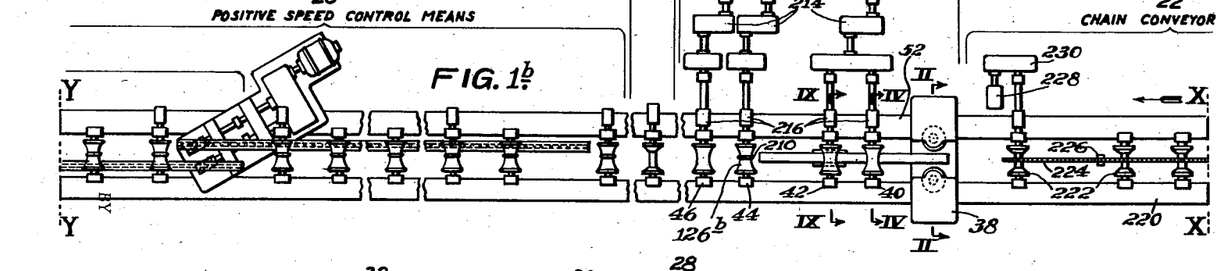
Figure 1C:
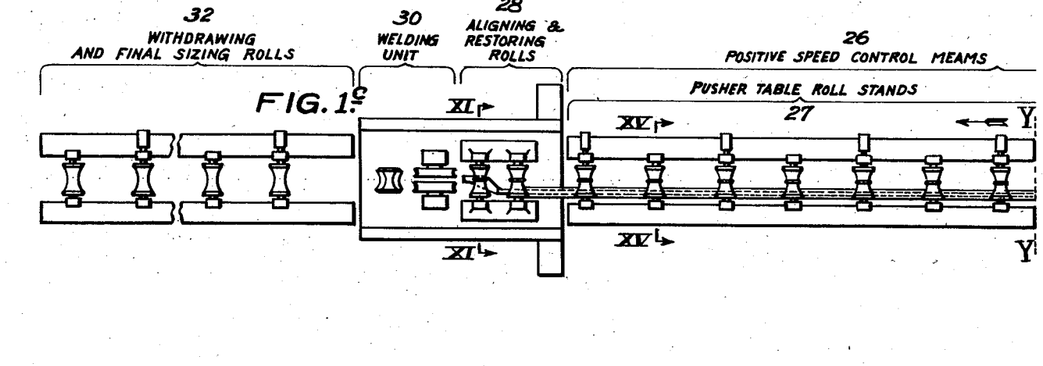
Figure 2:
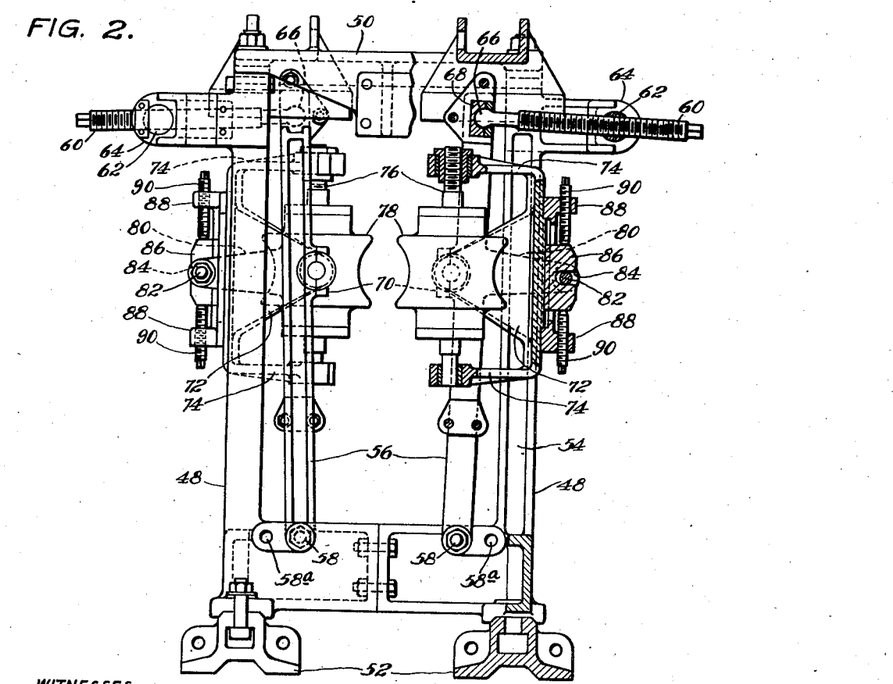
Fig. 2 is a vertical, cross-sectional view of the entering stand incorporated in the forming mill as taken on line II—II of Fig. 1b.

As more completely referred to in my copending application, Serial No. 12,785, on Method and apparatus for welding, and having particular reference to Figs. 1a, 1b, and 1c of the drawings, I preferably provide apparatus including a skelp-receiving table 10, an edge trimmer and worker 12, a skelp cleaner 14, conveyor 16, a press former 18, a conveyor 20, a chain conveyor 22, a forming mill 24, a conveyor 25, a positive speed control means 26, a pusher table roll stands 27, aligning and restoring roll stands 28, a welding unit 30, and withdrawing and final sizing roll stands 32, in a continuous production line-up. Apparatus of this character is particularly adapted to the manufacture of relatively thick-walled, large diameter pipe, as, for example, used in casing oil wells, transmitting gas and oil, etc. The thickness of the skelp ordinarily varies from ⅛ to ½ inch, and pipe from 6 to 30 inches in diameter can be made.

Forming mill

The forming mill, indicated as a whole by the numeral 24, includes an entering roll stand 38, roll stand 40, mandrel roll stand 42, and roll stands 44 and 46.

Entering stand

Figure 3:
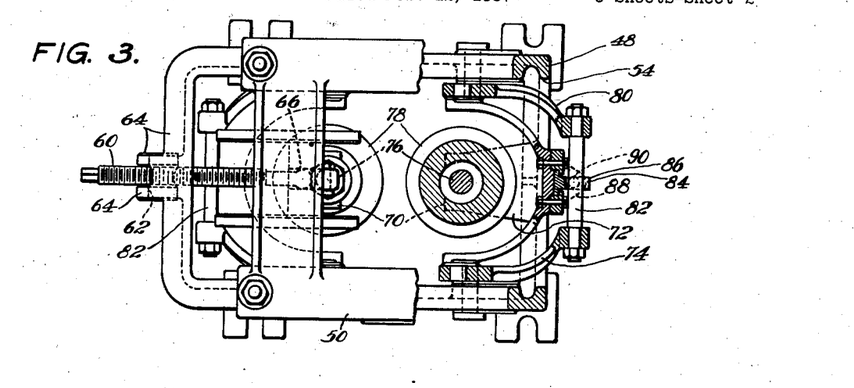
Fig. 3 is a plan view partly in section of the entering roll stand shown in Fig. 2.
Figures 4, 5, 6:
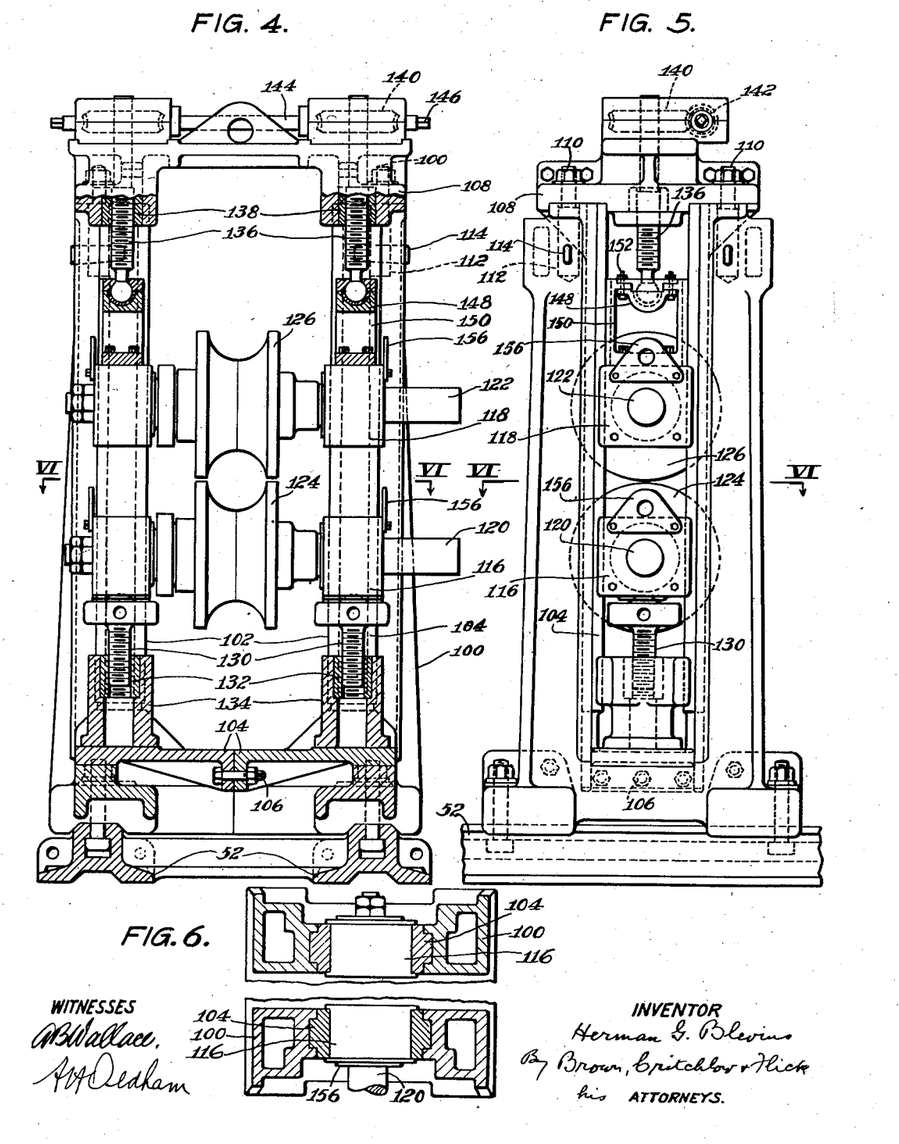
Fig. 4 is a transverse vertical cross-sectional view taken on line IV—IV of Fig. 1b and illustrating a typical forming or sizing roll stand.
Fig. 5 is a side elevation of the roll stand shown in Fig. 4.
Fig. 6 is a horizontal cross-sectional view taken on line VI—VI of Fig. 5.

As best shown in Figs. 3 and 4, the entering roll stand 38 includes a housing 48 formed of two halves bolted together at their bottom and provided with a cap 50 bolted to and spanning the tops. The housing 48 is bolted to a pair of rails 52 secured to the floor and extending longitudinally of the forming mill. The housings 48 are provided with windows 54 and vertically extending arms 56 are pivotally connected at their lower ends, as at 58, to the housings at the sides of the windows. Holes 58a are also provided to receive the pivotal connections when larger rolls are used. The upper ends of the arms 56 are adjustably secured to the housing as by the provision of screws 60 threaded into tiltably mounted nuts 62 carried by U-shaped brackets 64 secured in the upper ends of the windows 54. The connection between the screws 60 and the arms 56 may comprise ball and socket joints 66, carried by a bar 68 bridging and connecting the upper ends of the arms 56.

Each pair of arms 56 is formed with aligned bearings substantially midway of the length of each arm, which bearings rotatably journal as at 70 a yoke frame 72. The yoke frame 72 has brackets 74 formed at its top and bottom which journal shaft 76 carrying roll 78. The angular position of the yoke 72 about its bearing support 70 is controlled in any suitable manner as by the provision of opposed brackets 80 on each of the arms 56, which brackets are connected by a pin 82 received in a slot 84 formed in a block 86 gibbed to the back of the yoke 72. The back of the yoke is provided with blocks 88 which are threaded and receive screws 90 extending into engagement with the ends of the block 86.

In this manner by untightening one of the screws 90 and tightening the other screw, the yoke 72 is swung about its bearing support 70 on the arms 56 so as to tilt the axis of roll 78 at any desired angle relative to the vertical. Furthermore, the adjustment of screws 60 permits movement of the rolls 78 toward and from each other, as will be evident. By the combination of adjustments provided, the distance between the roll 78 and also their angular relation with each other, and with a tubular pipe blank entering the roll stand, can be adjusted so as to best receive any particular blank and shape it to be passed to the forming stands proper of the mill. More specifically, I have found that it is highly advisable to adapt the roll to the shape of the blank rather than attempt to adapt the blank to the roll as is the usual practice. As a result the entering roll stand just described is adapted to receive relatively short lengths of relatively heavy tubular blanks of large diameter without shock to the various stands or the mill or damage to the blank. The function of the entering roll stand is to simply return the blank to the shape to which it was bent by the forming press.

Forming roll stand

As best seen in Figs. 4 and 5, the first forming roll stand 40 comprises an outer housing 100 formed in two halves bolted together at their bottoms and adjustably secured to the rails 52 resting upon the foundation. The outer housing is provided with vertically extending windows 102 which in the form of the invention illustrated slidably receive an inner housing 104 also formed in two halves and bolted together as at 106. The inner housing 104 has a cap 108 secured thereto and to the outer housing 100 by stud bolts 110 having shank portions 112 extending into recesses formed in the top of the outer housing 100 and secured thereto by wedge keys 114.

Slidably positioned in the inner housing are lower and upper bearing blocks 116 and 118 which journal shafts 120 and 122 mounting working rolls 124 and 126. The position of the lower bearing block 116 is controlled by adjustable screw mechanism comprising screws 130, which are threaded into nuts 132 secured in stud cylinders 134 mounted on the bottom of the inner housing 104. Controlling the position of the upper bearing block 118 are screws 136 threaded into nuts 138 secured to the cap 108. The upper ends of the screws 136 are provided with worm gears 140 which engage with worms 142 mounted upon a shaft 144 rotatably carried by the cap 108. Shaft 144 is formed with square ends 146 for receiving a wrench whereby the vertical position of the screws 136 can be adjusted. The lower ends of each of the screws 136 is formed with a ball received in a socket plate 148 which is received within a hollow box 150 secured to the top of the upper bearing block 118 and mounted for vertically slidable movement in the inner housing 104. Bolts 152 fasten the socket plate 148 to the box 150. It will be seen that by the provision of this construction, if the work operated on by the rolls 124 and 126 improperly enters the rolls, the bolts 152 will break the tension before any other parts of the structure. The safety structure is simple and mechanically sound and constitutes an improvement upon the relatively complicated shear plates and like structures of the prior art. There is no danger of bending the screw 136.

Ordinarily in the operation of my improved apparatus the changing of roll sizes is a relatively simple procedure. The nuts of the stud bolts 110 are removed and the entire inner housing 104 including the housing cap 108 is lifted out by a crane. A new inner housing with different roll sizes can be readily substituted so that a roll change is a matter of a very few minutes. I likewise contemplate removing the upper cap 108 alone which allows the individual bearing blocks 118 and 116 to be picked out of the inner housing by an overhead crane. To facilitate such an operation I provide apertured plates 156 on each of the bearing blocks to receive the crane hook.

In addition to facilitating roll changes, as just described, the combination in a roll stand of inner and outer housings provides a single outer housing for strength and removable inner housings to adapt the outer housing to take rolls of desired size. Thus instead of providing a separate strong housing for each roll size I achieve the desired result while effecting a considerable saving in housing cost. Moreover, with smaller sized rolls shorter shafts are used having bearings closer together. This is advisable as the smaller rolls can be used without undesirable deflection of their supporting shafts.

Figure 7:
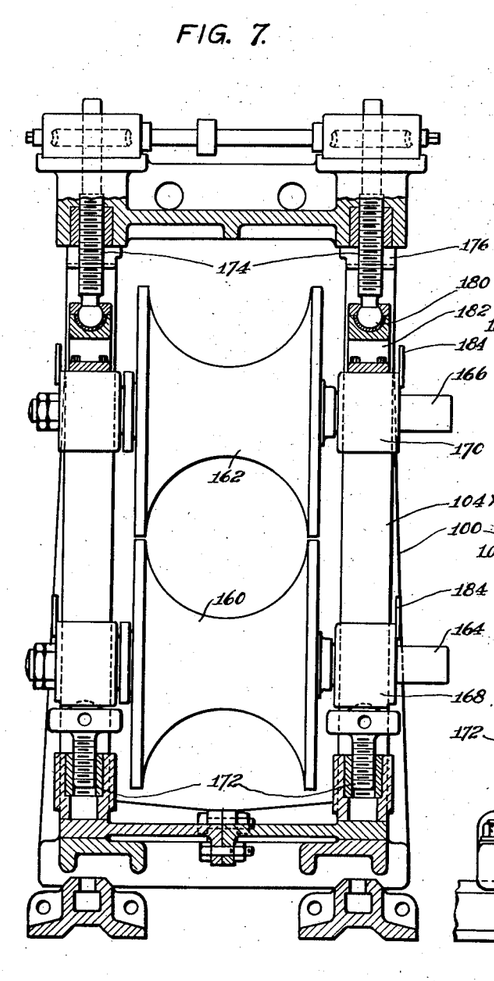
Fig. 7 is a view similar to Fig. 4 but illustrates a different roll size mounted in the stand.
Figure 8:
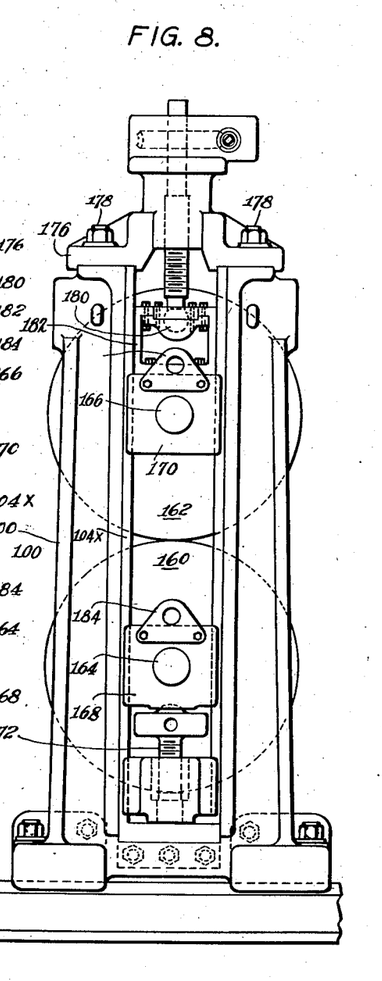
Fig. 8 is a side elevation of the roll stand illustrated in Fig. 7.

The outer housing 100 illustrated in Figs. 4 and 5, and just described, with various inner housings is adapted to handle rolls capable of working on tubular blanks of diameters from about 6 to about 30 inches. More particularly, in mounting large rolls in the stand the inner housing 104 is replaced with an inner housing 104× which receives the individual roll bearing blocks as shown in Figs. 7 and 8. In these figures of the drawings the numerals 160 and 162 indicate working rolls mounted upon shafts 164 and 166 journaled respectively in bearing blocks 168 and 170. The bearing blocks are slidably received in the windows of the inner housing 104×.

Screw mechanism, indicated as a whole by the numeral 172 and similar to that heretofore described, is adapted to control the vertical position of the lower bearing blocks 168. The position of the upper bearing blocks 170 is controlled by screw mechanism 174, similar to that heretofore described, and carried by an upper cap 176 removably secured to the top of the housing 100 by stud bolts 178. A tension bolt connection 180, including a box 182, connects the screw mechanism to the upper bearing blocks 170, as more particularly described heretofore in conjunction with Figs. 4 and 5. Each of the bearing blocks is provided with an apertured plate 184 to facilitate picking up the bearing blocks individually by an overhead crane.

In the operation of the roll stand shown in Figs. 7 and 8, roll changes are accomplished in a relatively simple manner by merely removing the nuts of the stud bolts 178 which permits the inner housing 104× and cap 176 to be removed. Another inner housing having rolls of the desired size is then dropped into the outer housing and the nuts on the stud bolts are replaced. Likewise, the change to smaller rolls is simple in that the larger rolls and their associated housing 104× are removed from the outer housing, and the inner housing 104 with the rolls assembled therein is dropped into position in the outer housing as heretofore described. An inner housing of any desired size and transverse distance between bearing blocks can be used so that any particular roll set-up can be assembled and made interchangeable in the outer housing.

*Mandrel roll stand*

Figures 9, 10:
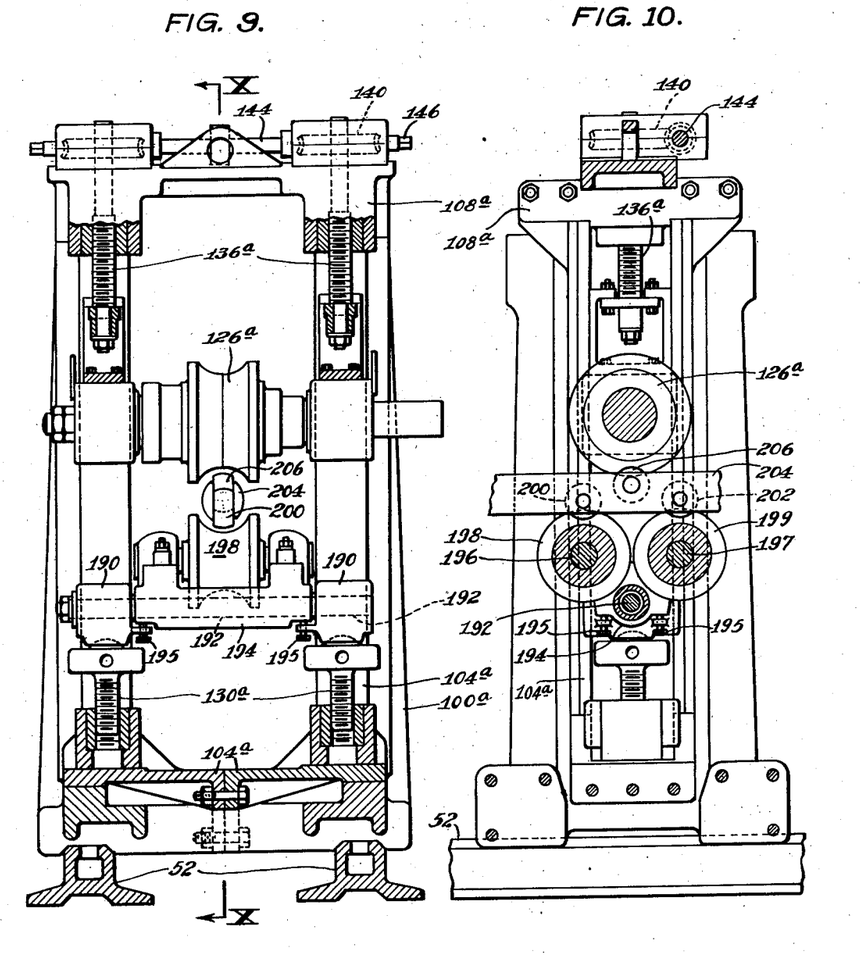
Fig. 9 is a transverse vertical cross-sectional view taken on line IX—IX of Fig. 1b and illustrates the roll stand adapted for use with the internal blank-forming mandrel.
Fig. 10 is a vertical cross-sectional view taken on line X—X of Fig. 9.

As will be evident from Figs. 1b, 9 and 10, the mandrel roll stand, indicated as a whole by the numeral 42, includes an outer housing 100a, an inner housing 104a, an upper cap 108a, upper screw mechanism 136a, lower screw mechanism 130a, all of substantially identical construction to that heretofore described in detail with respect to the first roll stand shown in Figs. 4 to 8. The housing 100a is adjustably mounted upon the rails 52 resting upon the foundation. The entire roll stand with the exception of the lower roll block assembly is substantially identical with that described above and hence will not be described in detail.

Considering specifically the construction of the lower roll block assembly, the blocks indicated by the numerals 190 carry a shaft 192 in turn supporting a bracket saddle 194 journaling shafts 196 and 197 carrying rolls 198 and 199. As best seen in Fig. 10, the rolls 198 and 199 are vertically opposed to rollers 200 and 202 rotatably mounted upon a mandrel 204 fixed longitudinally and positioned as illustrated. The mandrel 204 rotatably carries an upper roller 206 vertically opposed to the upper roll 126a of the stand.

In the drawings, the stand and associated mandrel have been illustrated without a tubular blank therein but it will be evident that in the operation of the stand the tubular blank passing therethrough is worked between the rolls 126a, 198 and 199, and the rollers 200, 202 and 206 on the mandrel. The mandrel rollers, and particularly the roller 206, shape and work the tubular blank both inside and outside so as to render the edges of the tubular blank, later to be joined by welding, smooth and longitudinally straight and free from buckles and of the desired curvature. Any inwardly bent areas of the blank which can not be removed by external rolling only are returned to proper position. The lower roll block assembly provides a pivotal mounting for the bracket saddle 194 in the lower blocks 190 and is advantageous in that the lower rolls 198 and 199 better adapt themselves and the mandrel to receive the entering end of a pipe blank. Moreover, the pressure between the rolls and the mandrel rollers is evenly distributed at all times and the rolls adapt themselves to the shape of the blank so that regardless of slight variations in thickness of the tubular blank worked substantially the only work done on the blank is at the edges of the seam which are shaped and aligned for subsequent welding. While the bracket saddle 194 may be allowed to be free for rocking or pivoting movement I often lock it in position after initial adjustment or clearance determination. Screws 195 for adjusting and locking between opposed shoulder portions on the blocks 190 and the saddle 194 are provided as seen in Figs. 9 and 10.

Since the mandrel roll stand includes an outer housing 100a and an inner housing 104a, changes of roll size are facilitated as heretofore discussed under consideration of the roll stand as shown in Figs. 4 to 8. The operation of the stand in this respect is similar to that heretofore described.

Other roll stands

Roll stands 44 and 46 are identical to roll stand 40, particularly illustrated in Figs. 4 to 8, with the exception that preferably the roll stand 44 includes an upper roll 126b having a central rib or fin 210 which extends between the edges of the tubular blank being worked and effects a guiding and aligning operation.

All of the described roll stands of the forming mill, with the exception of the entering stand 38, are power driven, as by the provision of motors 212 connected through suitable reduction gear boxes 214 to the shafts of the individual roll stands. The connections to the roll stands include quickly releasable couplings 216 of known type.

Power conveyors associated with forming mill

Incorporated with the forming mill and actually forming a part thereof are means for positively moving a tubular blank into the mill. These means as heretofore described may comprise a chain conveyor 22 having a frame 220 carrying at longitudinally spaced points a plurality of blank-supporting rollers 222, certain of which include sprockets carrying a chain 224 having adjustable lugs 226 secured thereto adapted to engage behind the end of a tubular blank to be moved into the forming mill. A motor 228 operating through a gear box 230 is employed to drive the chain 224.

By mechanism of the character indicated a tubular blank to be formed is moved onto the rollers 222 and is picked up by one of the lugs 226 carried by the chain engaging behind the tubular blank. Movement of the chain by motor 228 moves the tubular blank into the entering roll stand 38 and into the first roll stand 40, after which the drive of the various roll stands moves the tubular blank through the forming mill.

As the tubular blank leaves the forming mill it is received by the conveyor 25 which is of any desired length, as for example, to receive one or more blanks. At least certain of the conveyor rolls are driven whereby the blanks received thereby are carried to the positive speed control means 26.

Aligning and restoring roll stands

Figure 11:
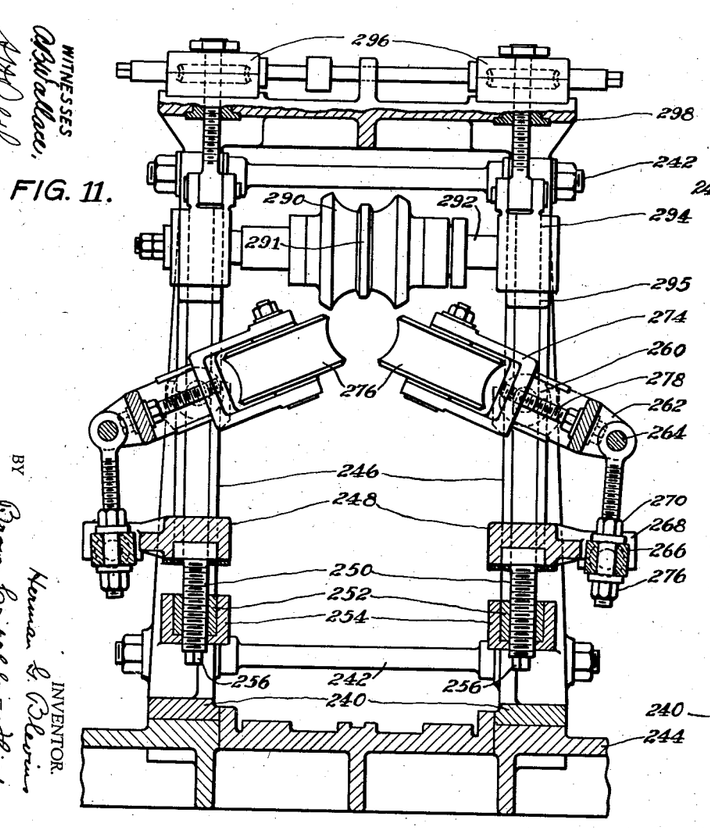
Fig. 11 is a transverse vertical cross-sectional view of an aligning and restoring roll stand adjacent the welding unit as taken on line XI—XI of Fig. 1c.

As indicated in Figs. 1b and 1c, I preferably include as part of the welding apparatus an aligning and restoring roll stand shown in detail in Figs. 11 to 14 with Fig. 11 being taken on line XI—XI of Fig. 1c. In all events the roll stand includes a housing formed of two side frame members 240 connected together by transverse tie rods 242 and adjustably mounted upon a suitable base 244 (may be extension of rails 52). The housing frames 240 include vertically extending windows 246 which slidably receive boxes 248. The vertical position of the boxes 248 is controlled by screws 250 having threaded engagement with nuts 252 carried in transverse portions 254 formed integrally with the side frames 240 of the housing. The screws 250 extend through the bottom of the transverse portions 254 of the side frames and are formed with square ends 256 to which a wrench may be secured to adjust the position of the boxes 248.

Figure 12:
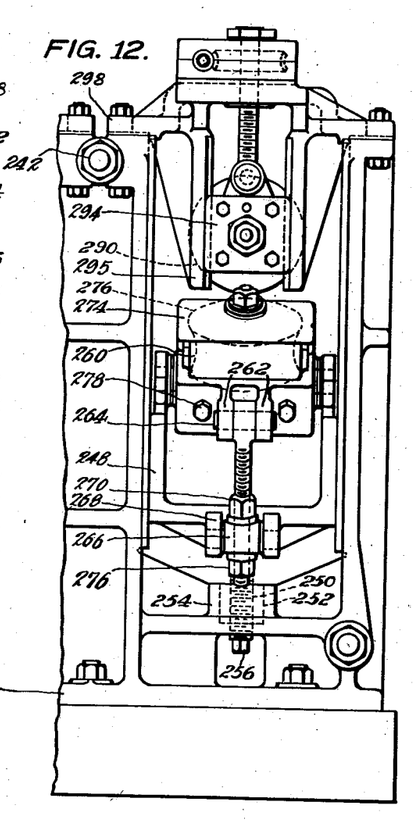
Fig. 12 is an end elevation of the stand illustrated in Fig. 11.

Pivotally mounted in each box 248 is a yoke 260 having a bifurcated bracket 262 at its closed end receiving and pivotally connected to an I-bolt 264. The I-bolt extends through a block 266 pivotally carried in a centrally positioned and horizontally extending bracket 268 formed integrally with the lower end of each box 248. Nuts 270 threaded on the I-bolt 264 control the position of the I-bolt in the block 266 and thus the angular position of the yoke 260. Slidably mounted in each yoke 260 is a U-shaped bracket 274 rotatably journaling a roll 276. The position of the U-shaped bracket 274 in the yoke 260 is controlled by bolts 278 connected to the bottom of the U-bracket 274 and extending through the bottom of the yoke 260.

By the mechanism just described, the rolls 276 can be adjusted to a plurality of positions to allow them to most properly engage with a tubular blank to hold it in formed shape, restore it to formed shape, and to assist in aligning the seam of the blank. More particularly, the adjustment of the screws 250 raises boxes 248 and rolls 276 in a straight vertical direction. Adjustment of the nuts 270 on I-bolts 264 swings the rolls 276 in a vertical plane about a horizontal axis and adjustment of bolts 278 effects movement of the rolls 276 toward or from each other, as will be evident.

In combination with the rolls 26 is an upper roll 290 preferably formed with a fin 291 and mounted on a shaft 292 carried in the bearing blocks 294. The bearing blocks are received by windows 295 formed in a cap 298 removably secured to the top of the housing frames 240. The vertical position of the bearing blocks 294 is controlled by screw mechanism, indicated as a whole by the numeral 296, and of substantially similar characteristics to that heretofore described and carried by the cap 298.

Figure 13:
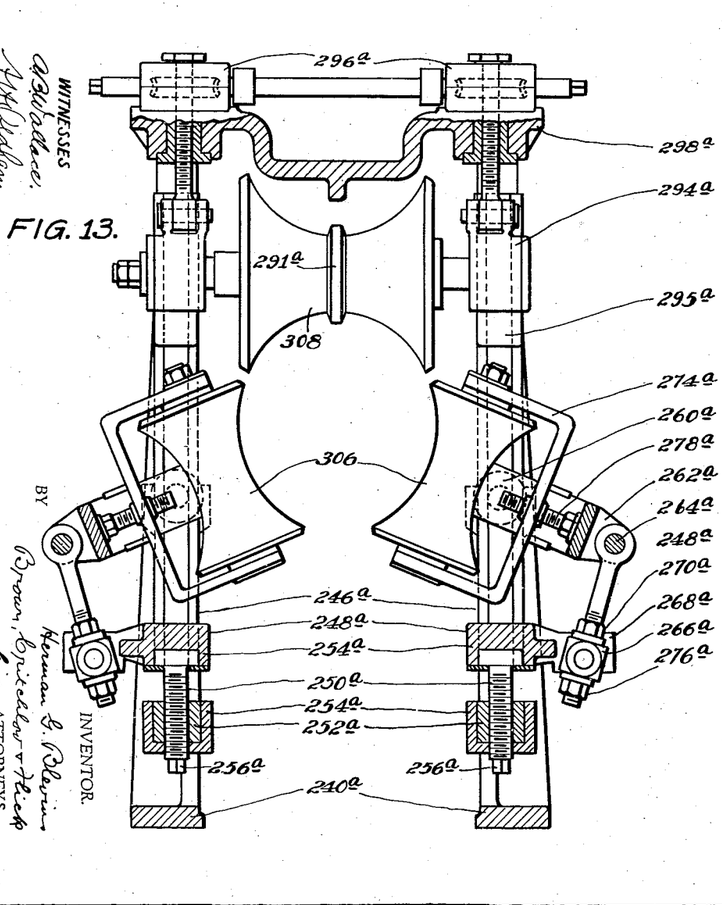
Figs. 13 and 14 are similar to Figs. 11 and 12 but illustrate the roll stand thereof mounting rolls of larger size.
Figure 14:
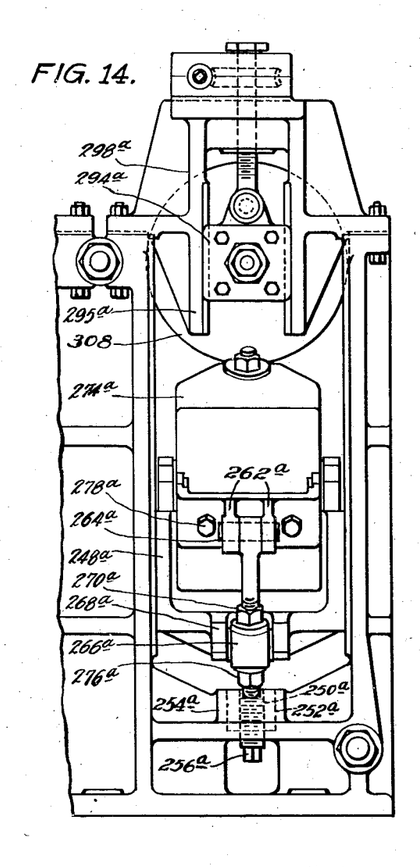

The roll stand illustrated in Figs. 11 and 12 and just described is readily adapted to be converted to a stand operating upon tubular blanks of larger diameter and therefore employing rolls of larger size. Thus, in Figs. 13 and 14 the apparatus is illustrated as including rolls 306 and 308 of larger size adapted to operate on a tubular blank of considerably larger diameter. Since the housing, yokes, screw mechanism, and the like of the form of the invention shown in Figs. 13 and 14 are exactly similar to that illustrated in Figs. 11 and 12, and above described, with the exception that certain of the roll-holding members are of larger size, the same numerals have been applied to Figs. 13 and 14 as employed in Figs. 11 and 12 except that the suffix *a* has been added to the numerals of Figs. 13 and 14.

Positive speed control means

Incorporated in the apparatus are means for positively engaging with a pipe blank and functioning to move it at a constant rate of speed through the welding throat. These means have been indicated in Figs. 1b and 1c by the numeral 26 and have been described and claimed in detail in my referred-to copending application entitled "Method and apparatus for welding", filed March 25, 1935, Serial No. 12,785, (Patent Number 2,084,889, granted June 22, 1937) and hence will not be described in detail here.

Pusher table roll stands

Figure 15:
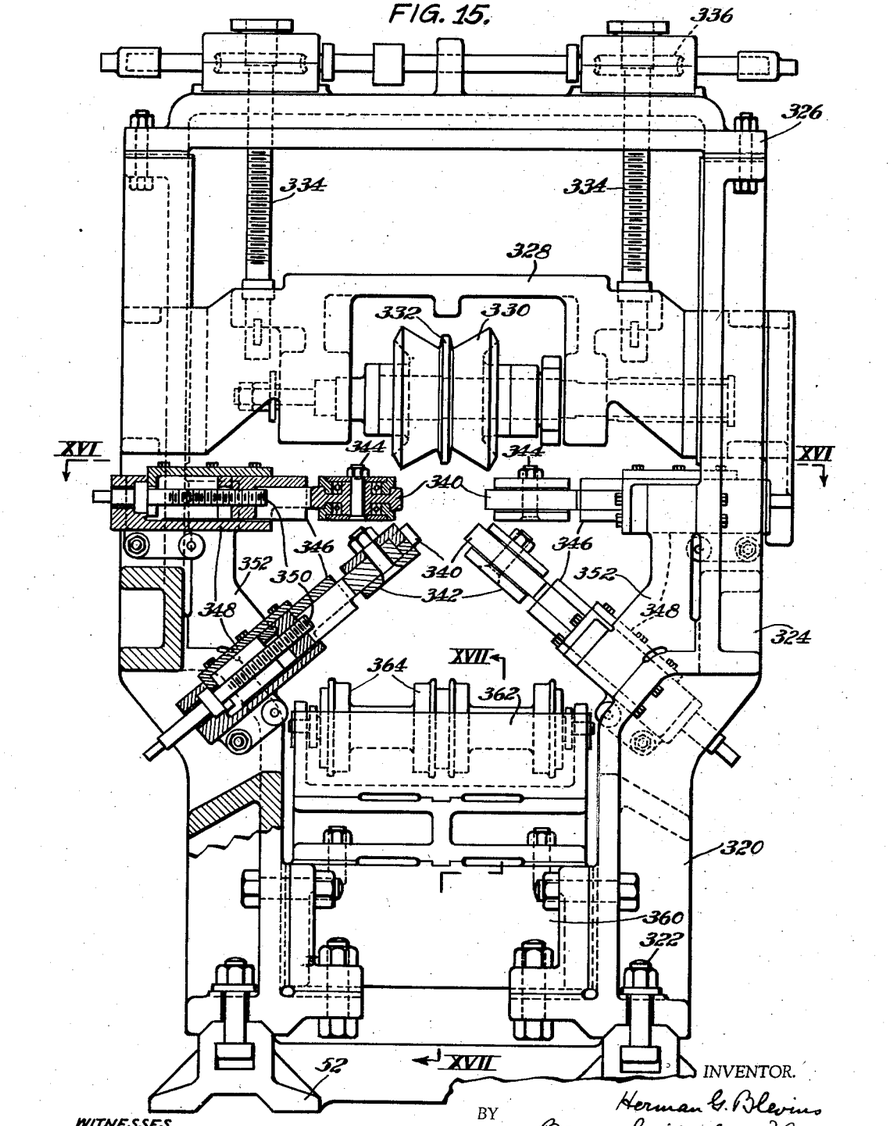
Fig. 15 is a transverse vertical cross-sectional view of a roll stand at the pusher table.

The positive speed control means for moving a pipe blank through the welding throat include pusher table roll stands for guiding and supporting the blank during the pushing movement. One of these stands has been illustrated in Figs. 15 to 17 of the accompanying drawings wherein the numeral 320 indicates generally a housing adjustably mounted by means of bolts 322 on the rails 52 forming the foundation of the various roll stands. As best seen in Fig. 15, the housing 320 is formed with an upper portion 324 of increased lateral width and a cap 326. Slidably mounted for vertical movement in the window of the portion 324 of the housing is a block 328 which journals an upper roll 330 formed with a central fin or rib 332 adapted to engage in the seam of the blank to be welded. The vertical position of the block 328 is controlled by screws 334 operated by known worm and worm-gear mechanism 336 carried by the housing cap 326.

Figure 16:
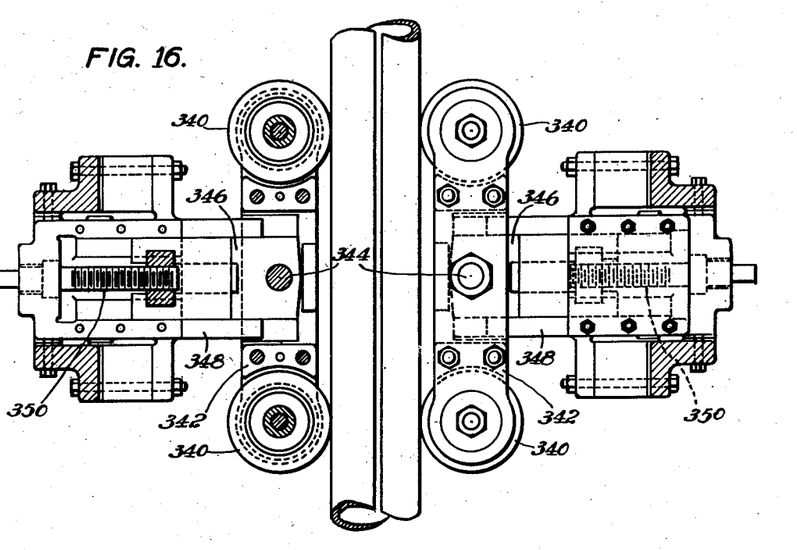
Fig. 16 is a horizontal cross-sectional view taken on line XVI—XVI of Fig. 15.
Figure 17:
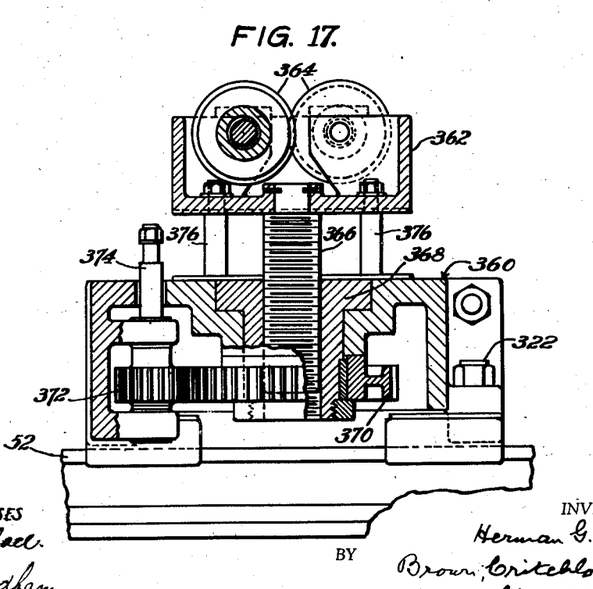
Fig. 17 is a vertical cross-sectional view taken on line XVII—XVII of Fig. 15.

The pusher table stands also include guiding and supporting rolls 340 which, as best seen in Fig. 16, are journaled at the ends of rocker arms 342 pivotally mounted as at 344 upon blocks 346 slidably carried by boxes 348. The position of the blocks 346 in the boxes 348 is determined by adjusting screws 350. The boxes 348 are, as seen in Fig. 15, secured to filler blocks 352, in turn fastened to the housing 320 adjacent the portion 324 of increased lateral width. As also indicated in Fig. 15, I provide a plurality of pairs of the rolls 340 which are mounted as described for movement to and from a tubular blank passing through the roll stand. However, the various pairs of rolls 340 are positioned as shown so as not to interfere with the positive speed control means which engage with the bottom of the tubular blank to push it at a constant speed through the pusher table stands and the welding throat. The relatively narrow width of each pair of rolls 340 facilitates their use without interference with the positive speed control means. The pivotal mounting of the rocker arms 342 facilitates the entry of the pipe blank into the roll stand as the rocker arm and roll assembly functions like a funnel.

While described in detail in my referred-to copending application, each pusher table roll stand includes a pusher table indicated as a whole by the numeral 360 which is secured in the bottom of the window of the housing 320. The pusher table 360 includes a box 362 in which are journaled rollers 364 which slidably support the pusher racks, not shown, of the positive speed control means. The axes of the rollers 364 are longitudinally offset with respect to each other as evident from Fig. 17 so that their bearing support is facilitated. The box 362 carrying the rollers 364 is mounted for vertical movement to and from the pusher table 360, and this is achieved in the embodiment of the invention illustrated by the provision of a screw 366 which is secured to the center of the bottom of the box 362 and extends vertically down through the pusher table 360. A nut 368 is threaded upon the screw 366 and is carried for rotary movement by the pusher table 360. Secured to the nut 368 is a gear 370 which is engaged by a pinion 372 mounted upon a shaft 374 journaled in the pusher table 360. Thus rotation of the shaft 374 by a wrench or crank rotates the nut 368 and moves the screw 366, box 362 and rollers 364 in a vertical direction. The box 362 is held against rotary movement and in proper alignment by rods or bolts 376 secured to the bottom of the box and extending slidably through the pusher table 360.

By the mechanism just described I am able to adapt my positive speed control means and pusher table roll stands to handle blanks of widely varying size, as for example from 6 to 30 inches in diameter. With the smaller blank size the rollers 364 and their supporting box 362 are moved to a relatively high vertical position. When blanks of large diameter, as, for example, 18 to 30 inches, are handled the rollers 364 and their supporting box 362 are moved down adjacent the top of the pusher table 360. Likewise, the rolls 340 of the stand can readily be adapted to handle blanks of widely varying size. When small-sized blanks are handled the rolls are positioned substantially as shown in the drawings. However, when blanks of considerably larger size are handled the filler blocks 352 carrying the rolls 340 are removed from the housing 320 and 324 and the boxes 348 are secured directly to the housing. The vertical position of the upper roll 330 can be adjusted by means of the mechanism 336 as will be understood.

It will be recognized that the objects of my invention have been achieved by the provision of improved apparatus for forming and sizing tubular blanks such as pipe blanks. The apparatus is readily adapted to changes in roll size and blank-handling mechanism and provides a combination of entering, forming, and restoring roll stands producing an improved pipe-forming operation. Tubular or pipe blanks from about 6 to about 30 inches can be handled by the apparatus thereby greatly reducing mill and equipment costs. Various roll stands are adapted to conform to the pipe and adapt it to be properly worked and the entire apparatus functions to operate advantageously when employed in conjunction with an electric resistance welding apparatus.

While in accordance with the patent statutes certain forms of my invention have been illustrated and described in detail, it should be appreciated that the invention is not limited thereto or thereby but is defined in the appended claims.

I claim:

1. A forming mill for relatively large diameter, thick-walled preformed pipe blanks comprising an entering roll stand having a pair of rolls journaled on substantially vertical axes, means for moving the rolls to and from each other, separate means for changing the angle of the roll axes with respect to the vertical, a plurality of forming roll stands each including an outer housing, a removable inner housing received in the outer housing and carrying working rolls on spaced horizontal axes, one of said stands being a mandrel roll stand including a top roll and a pair of bottom rolls having horizontal axes, the bottom rolls being journaled in a bracket pivotally mounted for movement about a horizontal axis, a mandrel positioned between the rolls and having rollers vertically aligned with and opposed to the top and bottom rolls, a restoring roll stand including a top roll on a horizontal axis, side rolls on axes inclined away from the vertical, means for controlling the vertical position of the side rolls, means for controlling the lateral distance between the rolls, means for adjusting the rolls about horizontal pivots in substantially vertical planes, and means for moving a preformed pipe blank into the forming mill.

2. A forming mill for relatively large diameter, thick-walled pipe comprising an entering roll stand having a pair of rolls journaled on substantially vertical axes, means for moving the rolls to and from each other, separate means for changing the angle of the roll axes with respect to the vertical, a plurality of forming roll stands each including an outer housing, a removable inner housing received in the outer housing and carrying working rolls on spaced horizontal axes, a mandrel roll stand including a top roll and a pair of bottom rolls having horizontal axes, the bottom rolls being journaled in a bracket pivotally mounted for movement about a horizontal axis, and a mandrel positioned between the rolls and having rollers vertically aligned with and opposed to the top and bottom rolls.

3. A forming mill for relatively large diameter, thick-walled pipe comprising a plurality of forming roll stands each including an outer housing, a removable inner housing received in the outer housing and carrying working rolls on spaced horizontal axes, one of said stands being a mandrel roll stand including a top roll and a pair of bottom rolls having horizontal axes, the bottom rolls being journaled in a bracket pivotally mounted for movement about a horizontal axis, and a mandrel positioned between the rolls and having rollers vertically aligned with and opposed to the top and bottom rolls.

4. A forming mill for relatively large diameter, thick-walled pipe comprising an entering roll stand having a pair of rolls journaled on substantially vertical axes, means for moving the rolls to and from each other, separate means for changing the angle of the roll axes with respect to the vertical, a plurality of forming roll stands each including an outer housing, a removable inner housing received in the outer housing and carrying working rolls on spaced horizontal axes, a restoring roll stand including a top roll on a horizontal axis, side rolls on axes inclined away from the vertical, means for controlling the vertical position of the side rolls, means for controlling the lateral distance between the rolls, and means for adjusting the rolls about horizontal pivots in substantially vertical planes.

5. A forming mill for relatively large diameter, thick-walled, preformed pipe blanks comprising an entering roll stand adapted to receive an open seam blank and substantially close it, a plurality of forming roll stands carrying working rolls on spaced horizontal axes, one of said stands being a mandrel roll stand including a top roll and a bottom roll having horizontal axes, a mandrel positioned between the rolls, and having rollers vertically aligned with and opposed to the top and bottom rolls, a restoring roll stand including a top roll on a horizontal axis, side rolls on axes inclined away from the vertical, and means for moving a blank into the mill.

6. A roll stand comprising a housing having opposed vertically extending windows therein, a pair of vertically extending arms pivotally secured at their lower ends to the housing adjacent the lower portion of each window, means adjustably securing the upper ends of the arms to the housing, a yoke pivotally secured on a horizontal axis between each pair of arms near their center, a roll rotatably supported by each yoke with the roll axis substantially vertical, and means adjustably controlling the relative angular position of each yoke and its supporting arms.

7. A roll stand comprising a housing having opposed windows therein, a pair of arms pivotally secured at their one end to the housing adjacent each window, means adjustably securing the other ends of the arms to the housing, a yoke pivotally secured on a horizontal axis between each pair of arms near their center, a roll rotatably supported by each yoke with the roll axis substantially vertical, and means adjustably controlling the relative angular position of each yoke and its supporting arms.

8. A roll stand comprising a housing having opposed vertically extending windows therein, a pair of yokes, means mounting a yoke in each window for movement to and from each other, a roll rotatably supported by each yoke with the roll axis substantially vertical, means for moving the yokes to and from each other and other means adjustably controlling the angle the roll axis makes with the vertical.

9. A roll stand comprising an outer housing, an inner housing vertically slidable into and from the outer housing, a pair of upper and a pair of lower bearing blocks slidably mounted in windows in the inner housing, a roll journaled in each pair of bearing blocks, screw means controlling the position of the lower bearing blocks, a cap for the housing extending over the inner and outer housing, quickly releasable means securing the cap to the outer housing and thus holding the housings together, screw means associated with the cap and controlling the position of the upper bearing blocks, and breakable tension devices connecting the screw means and the upper bearing blocks, the inner housing being removable as a unit with the outer housing adapted to receive an inner housing carrying a roll assembly of desired characteristics.

10. A roll stand comprising an outer housing, an inner housing vertically slidable into and from the outer housing, a pair of upper and a pair of lower bearing blocks slidably mounted in windows in the inner housing, a roll journaled in each pair of bearing blocks, means controlling the position of the lower bearing blocks, a cap for the housings extending over the inner and outer housings, quickly releasable means securing the cap to the outer housing and thus holding the housings together, and means associated with the cap and controlling the position of the upper bearing blocks.

11. A roll stand comprising an outer housing, an inner housing vertically slidable into and from the outer housing, a pair of upper and a pair of lower bearing blocks slidably mounted in windows in the inner housing, a roll journaled in each pair of bearing block, means controlling the position of the lower bearing blocks, a cap for the inner housing, quickly releasable means in conjunction with the cap securing the housings together, and means controlling the position of the upper bearing blocks, the inner housing being removable as a unit with the outer housing adapted to receive an interchangeable inner housing having rolls of different size.

12. A roll stand comprising an outer housing, an inner housing vertically slidable into and from the outer housing, upper and lower block sets slidably mounted in windows in the inner housing, a roll carried by each block set, means controlling the position of the lower block set, a cap for the housings, releasable means including the cap securing the housings together, and means associated with the cap and controlling the position of the upper block set, the inner housing being removable as a unit with the outer housing adapted to directly receive a different inner housing.

13. In combination, a mandrel, a roller journaled in the mandrel and extending above the surface of the mandrel, a pair of rollers positioned in front and behind the first-named roller and journaled in the mandrel and extending below the surface of the mandrel, a roll stand associated with the mandrel, and including a housing, an upper roll mounted in the housing and adapted to cooperate with the upper mandrel roll, a bracket pivotally secured to the housing, means for adjusting the bracket to and locking it in a desired angular position, and a pair of bottom rolls journaled in the bracket and adapted to cooperate with the lower mandrel rollers.

14. A roll stand comprising a housing having vertically extending opposed windows therein, boxes slidably mounted in the windows, means controlling the vertical position of the boxes in the windows, a yoke pivotally mounted in each box to rotate about a horizontal axis, means controlling the relative angular position of each yoke and box, a U-shaped bracket slidably mounted in each yoke, a roll journaled in each bracket on a substantially vertical axis, means controlling the position of the brackets in the yokes, and means associated with the housing and adjustably mounting a roll on a horizontal axis above the first-named rolls.

15. A roll stand comprising a housing having opposed windows therein, boxes slidably mounted in the windows, means controlling the position of the boxes in the windows, a yoke pivotally mounted in each box, means controlling the relative angular position of each yoke and box, a U-shaped bracket slidably mounted in each yoke, a roll journaled in each bracket, means controlling the position of the brackets in the yokes, and means associated with the housing and adjustably mounting a roll above the first-named rolls.

16. A roll stand comprising a housing having vertically extending opposed windows therein, boxes slidably mounted in the windows, means controlling the vertical position of the boxes in the windows, a roll supported by each box on a substantially vertical axis, means for moving each roll toward and from each other, means for adjusting the angle between each roll axis and the vertical, and means associated with the housing and adjustably mounting a roll on a horizontal axis above the first-named rolls.

17. In combination, a roll stand for guiding and supporting tubular members comprising a plurality of rocker arms, rolls pivotally carried at the ends of the rocker arms, means pivotally supporting the rocker arms near their centers so as to position the rolls to define a pair of aligned throats to guide and support tubular members.

HERMAN G. BLEVINS.